May 31, 1955  J. M. NAUL  2,709,762
ELECTRIC MOTOR STATOR CONSTRUCTION
Filed Dec. 9, 1953
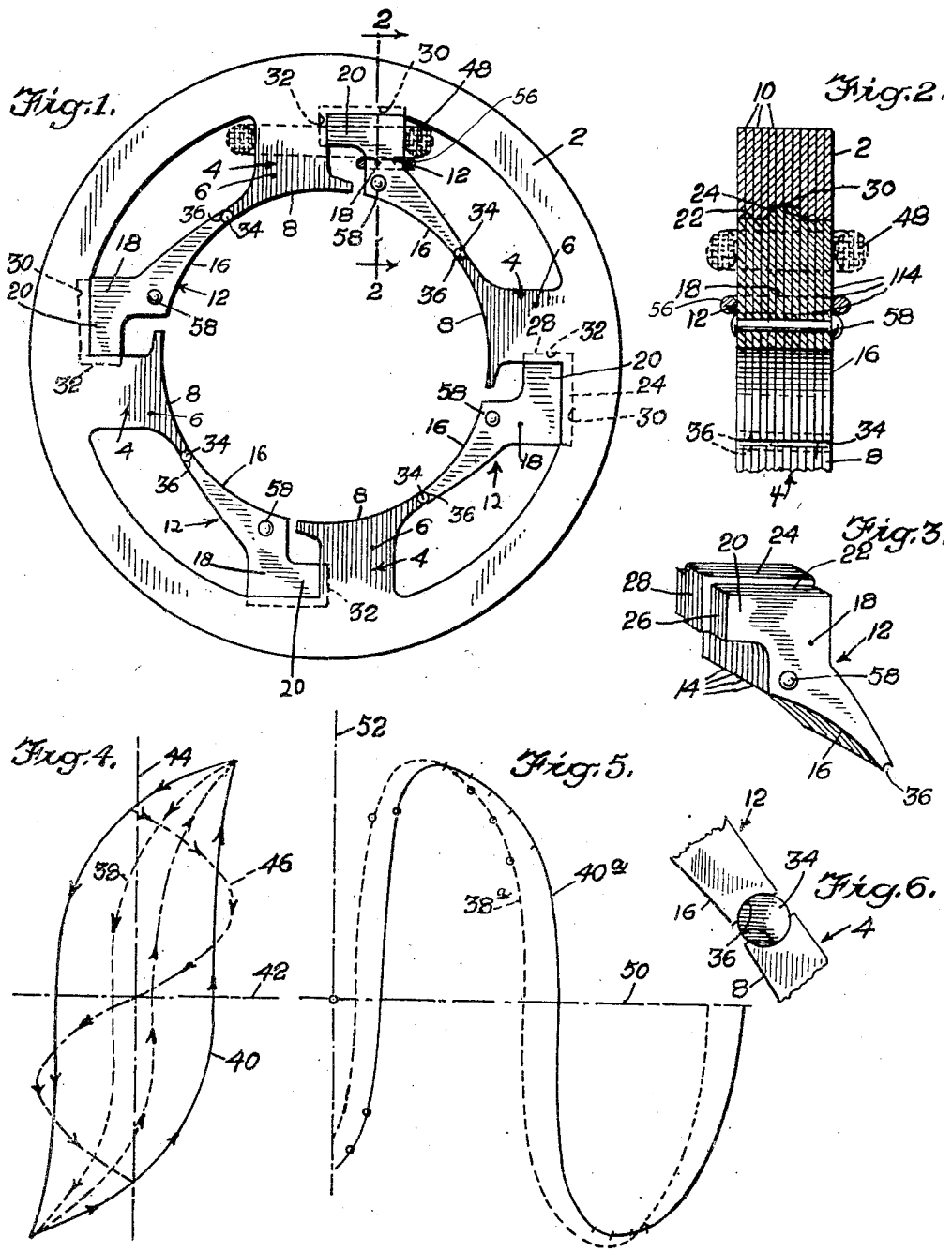
INVENTOR.
James M. Naul
BY
James and Franklin
Attorneys

United States Patent Office 2,709,762
Patented May 31, 1955

2,709,762

ELECTRIC MOTOR STATOR CONSTRUCTION

James M. Naul, Plainfield, N. J., assignor to Eastern Air Devices, Inc., Brooklyn, N. Y., a corporation of New York Application December 9, 1953, Serial No. 397,133

8 Claims. (Cl. 310—172)

The present invention relates to the construction of a stator for an electric motor, and more particularly to such a stator construction which facilitates the starting of the rotor in an induction motor.

In induction motors, the stators are provided with pole pieces energized so as to produce an alternating flux, the rotor positioned between the pole pieces having a magnetic status induced therein which tends to follow the resultant flux produced by the energization of the stator, that resultant flux rotating about the axis of the motor. Once the rotor is rotating, it experiences little difficulty in following the movement of the resultant stator flux, but the rotor will not, unaided, commence rotation. Several expedients have been resorted to in order to provide such a motor with a self-starting characteristic. Special pole face shapings, providing for an unusual flux distribution between stator and rotor, have been tried. They have not proven satisfactory, to a large extent because they adversely affect the normal running characteristics of the motor. One of the methods of achieving a self-starting effect is by using so-called shaded poles, the pole pieces of the stator being divided into two sections and a short circuited conductive coil surrounding one of those sections. The electromagnetic interaction between the short-circuited or shading coil and the alternating flux induced in the pole piece by the energizing coil causes the flux in the shaded pole section to lag behind the flux in the unshaded pole section. The flux distribution thus produced causes the rotor to commence rotation without having to apply any mechanical force thereto.

Shaded poles have been adopted on a wide scale because of their simplicity, reliability and low cost, but they have never been considered as the ultimate in arrangements to produce starting torque, particularly because of the fact that the amount of starting torque which they can produce is limited.

The present invention relates to a novel way of producing the flux time lag which imparts a self-starting characteristic to a motor of the type under discussion. While the shaded pole type of construction produces that time lag through electromagnetic interaction between a pole piece section and a short circuited conductor surrounding that pole piece section, the present invention teaches the production of that time lag through the use, in the pole pieces, of sections characterized by different magnetic hysteresis characteristics. The starting torque thus produced in a simple manner is comparable in magnitude to that produced by a shaded pole. Moreover, if a shaded pole is used in conjunction therewith, the time lag characteristics of the two arrangements, and hence the starting torque produced thereby, are cumulative. Hence by providing a shading coil around the pole piece section of greater magnetic hysteresis characteristic a starting torque will be produced much greater than that capable of attainment by the use of shading coils alone.

The hysteresis phenomenon is one which is well recognized in the field of magnetism. It relates to the fact that the flux through a section of magnetizable material often depends not only upon the magnitude of the energizing force applied thereto but also upon the previous magnetic history of the material. Different materials will exhibit different hysteresis characteristics, and consequently the same energizing force applied to such different materials may result in different magnetic fluxes passing therethrough. Moreover, when an alternating or cyclically varying energizing force is applied to a material having a particular hysteresis characteristic the magnitude of the flux passing therethrough at any given moment will vary not only according to the energizing force but also according to the hysteresis characteristic, and a substance having a more marked hysteresis characteristic will, during the variation of the energizing force, carry a flux which, at any given instant, is somewhat less than the flux through the first mentioned material. Thus hysteresis may be considered as a sort of magnetic viscosity.

If, as is here taught, the pole pieces of the stator be formed of two sections each energized by the same coil, the section being made of different materials characterized by different magnetic hysteresis characteristics, and if an alternating current is passed through the energizing coil, the flux through the two pole piece sections will not be the same at any given instant, the pole piece section exhibiting the greater magnetic hysteresis characteristic having a flux passing therethrough which lags behind the flux passing through the pole piece section having the lesser magnetic hysteresis characteristic. If, then, these pole piece sections be spaced from one another in the direction of rotation of the motor rotor to be used therewith, an interacting flux between stator and rotor will be set up which will have that time lag characteristic which will cause the rotor to be self-starting.

The stator of the present invention may, as is conventional, be built up from a plurality of stamped laminations, one section of each of the pole pieces being preferably formed integral with and of the same material as the ring of magnetizable material which connects their respective magnetic circuits. The other pole piece sections may also be built up from a plurality of stamped laminations secured together so that they may be assembled as a unit with the remainder of the stator, and in an extremely simple manner. The two pole piece sections have pole faces which are spaced from one another in the direction of rotation of the rotor to be used therewith, the pole piece sections defining parallel magnetic circuits energized by the same source. Because those circuits have different magnetic hysteresis characteristics, the flux passing from the pole faces of the respective pole piece sections to the rotor will exhibit a relative time lag characteristic which will start the rotor.

To the accomplishment of the above, and to such other objects as may hereinafter appear, the present invention relates to a stator construction as defined in the appended claims and as described in this specification, taken together with the following drawings in which:

Fig. 1 is a front elevational view of a stator made according to the present invention;

Fig. 2 is a cross sectional view taken along the line 2—2 thereof;

Fig. 3 is a perspective view of one of the pole piece sections;

Fig. 4 is a schematic and idealized representation of two representative magnetic hysteresis characteristics of the materials of which the pole piece sections may be formed, with a sinusoidal energizing current being shown;

Fig. 5 is a graph showing the flux relationships relative to time of the two pole piece sections, and whose magnetic hysteresis chracteristics are illustrated in Fig. 4; and Fig. 6 is a detail elevational view showing one manner in which the pole piece sections may be secured in place.

The stator comprises a ring 2 having first pole piece sections 4 spaced therearound and extending inwardly with respect thereto, each of the sections 4 having a radially inwardly projecting body portion 6 terminating in an arcuate pole face 8, the pole faces 8 having a common center of curvature preferably representing the axis of rotation of the rotor to be used therewith and having compartively wide circumferential gaps therebetween. The stator is built up of a plurality of laminations 10 having the shape disclosed and stamped or punched from sheet material, as is conventional.

Second pole piece sections 12 are built up of a plurality of laminations 14, also stamped or punched from sheet material and shaped so as to define an arcuate pole face 16, a body portion 18 adapted to extend radially inwardly with respect to the stator when the section 12 is assembled in place, and a laterally extending portion 20. Each second pole piece section 12 is adapted to be inserted between a pair of adjacent first pole piece sections 4 so that its pole face 16 is in line with and substantially fills the circumferential gap between adjacent pole faces 8, the edges 22 and 26 of the body portions 18 and 20 of the second pole piece sections 12 respectively engaging the ring 2 and the body portion 6 of the first pole piece section 4 with which it is associated at points outwardly radially spaced with respect to the pole faces 8 and 16 so that the two pole piece sections 4 and 12 define parallel magnetic circuits.

In order to facilitate insertion of the second pole piece section 12 in place, the outer edge 22 thereof may be provided with a projecting portion 24 and the lateral edge 26 thereof may be provided with a similar protruding portion 28, the inner surface of the ring 2 adjacent the first pole piece section 4 being provided with a recess 30 adapted to mate with the projection 24 and the lateral surface of the body portion 6 of the first pole piece section 4 being provided with a recess 32 into which the projection 28 is adapted to fit.

When the pole piece sections 4 and 12 are thus assembled, the pole face 16 of the second pole piece section 12 will be spaced at one end from the pole face 8 of the first pole piece section 4 with which it is directly associated and at the other end from the pole face 8 of the next adjacent pole piece section 4. In order to wedge the second pole piece section 12 in place, a pin 34 of some non-magnetizable material such as brass may be inserted between the adjacent end edges of the pole faces 16 and 8, those end edges being curved as at 36 to facilitate receiving the pin 34 (see Fig. 4).

As thus assembled, and with the body portions 6 and 18 of the first and second pole piece sections 4 and 12 respectively surrounded by a single energizing coil 48, it will be apparent that the pole piece sections 4 and 12 define parallel magnetic paths or circuits energized by a single source.

The pole piece sections 12 are formed of material different from that of which the first pole piece sections 4 and the rings 2 are formed, and in particular from a material characterized by a different magnetic hysteresis characteristic. For example, the main portion of the stator, comprising the ring 2 and the first pole piece sections 4, may be formed of mill annealed electric sheet steel, dynamo grade, such as is conventional for use in machines of this type, whereas the second pole piece sections 12 may be formed of tungsten sheet steel having a composition of 5% tungsten, 1% carbon and the balance iron. By using these materials, which are merely exemplary of innumerable other types of magnetizable materials which might be employed, the second pole piece sections 12 will have a more marked magnetic hysteresis characteristic than the first pole piece sections 4.

Fig. 4 illustrates schematically the hysteresis characteristics of two pole piece sections having different magnetic hysteresis characteristics, the broken curve 38 representing the hysteresis characteristic of the first pole piece section 4 and the solid curve 40 representing the hysteresis characteristic of the second pole piece section 12, the horizontal coordinate 42 of the graph representing the electrical energizing force and the vertical coordinate 44 of the graph representing the flux through the pole piece section in question. Also visible in Fig. 4 is broken curve 46, representing a sinusoidal current passing through the energizing coil 48 which simultaneously energizes the two pole piece sections 4 and 12. For purposes of illustration, only one coil 48 is shown in Fig. 1, but it will be understood that a similar coil rings all three of the other pole pieces.

Fig. 5 represents the flux passing through a given pole piece section with respect to time and is derived from Fig. 4, the horizontal coordinate 50 representing time and the vertical coordinate 52 representing flux. The broken curve 38a corresponds to the broken curve 38 of Fig. 4 and represents the flux passing through the first pole piece section 4. The solid curve 40a corresponds to the solid curve 40 of Fig. 4 and represents the flux passing through the second pole piece section 12. It therefore is apparent that when two pole piece sections 4 and 12 having the magnetic hysteresis characteristics of curves 38 and 40 respectively are energized by the same cyclically varying current 46, as is the case when the body portions 6 and 18 of those pole piece sections are surrounded by the same coil 48, the flux passing through the pole piece section having the greater magnetic hysteresis characteristic, that is to say, as here disclosed, the second pole piece section 12, will lag behind the flux passing through the other pole piece section, the first pole piece section 4. Hence it is seen that the time lag flux characteristic which is necessary for a self-starting motor has been produced without the use of a shading coil.

Assembly of the composite stator of the present construction is simple in the extreme. The laminations defining the rings 2 and first pole piece sections 4 are first secured together in any desired manner. The laminations defining the second pole piece section 12 are then assembled into a unit in any desired manner, as by the use of rivet 58. The energizing coils 48 are placed over the first pole piece sections 4, the second pole piece sections 12 are placed in position with the projections 24 and 28 thereon (if present) received within the corresponding recesses 30 and 32, and the wedging pins 34 are inserted. The stator is thus completely assembled and all of its parts are reliably secured in place.

The use of pole piece sections exhibiting different magnetic hysteresis characteristics produces a starting torque comparable in magnitude to that produced with the use of conventional shaded poles. This will ordinarily be adequate for most installations. Where that is not the case, a shading coil 56 may be placed around the body portion 18 of the second pole piece section 12 in order to intensify the flux time lag produced. The effect of the shading coil on the production of starting torque will be cumulative with the effect thereon of the high hysteresis pole piece sections, and the conjoint use of shading coils with such sections will produce a starting torque which will approach in magnitude the torque produced by capacitor-type starting systems.

The self-starting effect produced by the present invention can be intensified if the air gap between the rotor and the pole faces 16 of the sections 12 is less than the air gap between the rotor and the pole faces 8 of the sections 4. This will cause a greater proportion of the generated flux to pass through the pole sections 12, and it is this flux which, by reason of its time lag relative to the remainder of the generated flux, produces the starting torque. As another expedient to this end, the coils 48 might be provided with extra turns surrounding only the pole sections 12.

While but a single embodiment of the present invention has been here disclosed, it will be apparent that many variations may be made therein, for example, as to shape, size, number of poles, specific materials employed, and the like, all within the spirit of the present invention as defined in the following claims.

I claim:

1. A stator for an electric motor comprising a ring of magnetizable material, a plurality of main pole pieces of magnetizable material comprising radially inwardly extending body portions terminating in pole faces, said pole faces being spaced substantially from one another circumferentially so as to define circumferential gaps therebetween, and additional pole piece sections comprising a circumferential body portion and a radial body portion, the former extending laterally from the latter, said radial body portion terminating in a pole face, said additional pole piece sections being interposed between said main pole pieces respectively with their circumferential body portions engaging said ring and said main pole piece body portions, thereby spacing said radial body portions of said additional pole piece sections from said main pole piece body portions so that the body portions of said main and additional pole pieces define pairs of parallel separated magnetic paths, the pole faces of said additional pole piece sections being substantially concentric with the pole faces of said main pole pieces and substantially filling the gaps therebetween.

2. A stator for an electric motor comprising a ring of magnetizable material, a plurality of main pole pieces of magnetizable material comprising radially inwardly extending body portions terminating in pole faces, said pole faces being spaced substantially from one another circumferentially so as to define circumferential gaps therebetween, and additional pole piece sections comprising a circumferential body portion and a radial body portion, the former extending laterally from the latter, said radial body portion terminating in a pole face, said additional pole piece sections being interposed between said main pole pieces respectively with their circumferential body portions engaging said ring and said main pole piece body portions, thereby spacing said radial body portions of said additional pole piece sections from said main pole piece body portions so that the body portions of said main and additional pole pieces define pairs of parallel separated magnetic paths, the pole faces of said additional pole piece sections being substantially concentric with the pole faces of said main pole pieces and substantially filling the gaps therebetween, said additional pole piece sections being formed of magnetizable material characterized by a different magnetic hysteresis characteristic from that of said main pole pieces.

3. A stator for an electric motor comprising a ring of magnetizable material, a plurality of main pole pieces of magnetizable material comprising radially inwardly extending body portions terminating in pole faces extending circumferentially at least to one side of said body portions, said pole faces being spaced substantially from one another circumferentially so as to define circumferential gaps therebetween, and additional pole piece sections comprising a circumferential body portion and a radial body portion, the former extending laterally from the latter, said radial body portion terminating in a pole face, said additional pole piece sections being interposed between said main pole pieces respectively with their circumferential body portions engaging said ring and said main pole piece body portions on the side thereof opposite that to which said main pole piece pole faces extend, thereby spacing said radial body portions of said additional pole piece sections from said main pole piece body portions so that the body portions of said main and additional pole pieces define pairs of parallel separated magnetic paths, the pole faces of said additional pole piece sections being substantially concentric with the pole faces of said main pole pieces and substantially filling the gaps therebetween.

4. A stator for an electric motor comprising a ring of magnetizable material, a plurality of main pole pieces of magnetizable material comprising radially inwardly extending body portions terminating in pole faces extending circumferentially at least to one side of said body portions, said pole faces being spaced substantially from one another circumferentially so as to define circumferential gaps therebetween, and additional pole piece sections comprising a circumferential body portion and a radial body portion, the former extending laterally from the latter, said radial body portion terminating in a pole face, said additional pole piece sections being interposed between said main pole pieces respectively with their circumferential body portions engaging said ring and said main pole piece body portions on the side thereof opposite that to which said main pole piece pole faces extend, thereby spacing said radial body portions of said additional pole piece sections from said main pole piece body portions so that the body portions of said main and additional pole pieces define pairs of parallel separated magnetic paths, the pole faces of said additional pole piece sections being substantially concentric with the pole faces of said main pole pieces and substantially filling the gaps therebetween, said additional pole piece sections being formed of magnetizable material characterized by a different magnetic hysteresis characteristic from that of said main pole pieces.

5. The stator of claim 1, in which said ring and said main pole piece body portions are provided with recesses and in which said additional pole piece sections are provided with projections fitting into said recesses when said pole piece sections are assembled into said stator.

6. The stator of claim 2, in which said ring and said main pole piece body portions are provided with recesses and in which said additional pole piece sections are provided with projections fitting into said recesses when said pole piece sections are assembled into said stator.

7. The stator of claim 3, in which said ring and said main pole piece body portions on the side thereof opposite that to which said main pole piece pole faces extend are provided with recesses and in which said additional pole piece sections are provided with projections fitting into said recesses when said pole piece sections are assembled into said stator.

8. The stator of claim 4, in which said ring and said main pole piece body portions on the side thereof opposite that to which said main pole piece pole faces extend are provided with recesses and in which said additional pole piece sections are provided with projections fitting into said recesses when said pole piece sections are assembled into said stator.

References Cited in the file of this patent

UNITED STATES PATENTS

| | | |
|---|---|---|
| 1,735,222 | Thompson | Nov. 12, 1929 |
| 2,037,606 | Van Der Woude | Apr. 14, 1936 |
| 2,110,686 | Verrall | Mar. 8, 1938 |

FOREIGN PATENTS

| | | |
|---|---|---|
| 606,021 | Germany | Nov. 23, 1934 |